(12) United States Patent
Werner et al.

(10) Patent No.: US 10,326,611 B2
(45) Date of Patent: Jun. 18, 2019

(54) SYSTEM AND METHOD FOR NETWORK DEPLOYMENT AND MANAGEMENT

(71) Applicant: COMCAST CABLE COMMUNICATIONS, LLC, Philadelphia, PA (US)

(72) Inventors: Anthony Gene Werner, Philadelphia, PA (US); James Stephen Poder, Cheltenham, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 15/676,758

(22) Filed: Aug. 14, 2017

(65) Prior Publication Data

US 2018/0191519 A1 Jul. 5, 2018

Related U.S. Application Data

(63) Continuation of application No. 15/142,832, filed on Apr. 29, 2016, now Pat. No. 9,774,469, which is a continuation of application No. 14/161,206, filed on Jan. 22, 2014, now Pat. No. 9,356,797.

(51) Int. Cl.
*H04B 3/54* (2006.01)
*H04L 12/28* (2006.01)

(52) U.S. Cl.
CPC ............ *H04L 12/2856* (2013.01); *H04B 3/54* (2013.01); *H04L 12/2838* (2013.01); *H04L 12/2898* (2013.01); *H04L 2012/2841* (2013.01)

(58) Field of Classification Search
CPC .......... H04B 3/54; H04B 3/542; H04B 3/544; H04B 3/546; H04B 3/548; H04L 12/28; H04L 12/2838; H04L 12/2898; H04L 2012/2841; H04L 47/30
USPC .................... 455/3.01, 3.02, 3.03, 3.05, 3.06
See application file for complete search history.

(56) References Cited

U.S. PATENT DOCUMENTS

| | | | |
|---|---|---|---|
| 9,356,797 | B2 | 5/2016 | Werner et al. |
| 9,774,469 | B2* | 9/2017 | Werner ............... H04L 12/2838 |
| 2011/0085525 | A1 | 4/2011 | Patini |
| 2013/0059625 | A1 | 3/2013 | Clegg et al. |
| 2015/0208249 | A1 | 7/2015 | Werner et al. |
| 2016/0323120 | A1 | 11/2016 | Werner et al. |

OTHER PUBLICATIONS

U.S. Appl. No. 14/161,206, filed Jan. 22, 2014, U.S. Pat. No. 9,356,797, May 31, 2016, Anthony Werner.
U.S. Appl. No. 15/142,832, filed Apr. 29, 2016, U.S. Pat. No. 9,774,469, Sep. 26, 2017, Anthony Werner.

* cited by examiner

*Primary Examiner* — Philip Sobutka
(74) *Attorney, Agent, or Firm* — Ballard Spahr LLP

(57) ABSTRACT

Systems and methods are disclosed comprising receiving an upstream service signal from a premises. In an aspect, the systems and methods are configured for providing a wireless signal based on the received service signal external to the premises.

20 Claims, 12 Drawing Sheets

SYSTEM AND METHOD FOR NETWORK DEPLOYMENT AND MANAGEMENT

CROSS REFERENCE TO RELATED PATENT APPLICATION

This application is a continuation of U.S. application Ser. No. 15/142,832, filed Apr. 29, 2016, which is a continuation of U.S. application Ser. No. 14/161,206, filed Jan. 22, 2014 and issued as U.S. Pat. No. 9,356,797, which are herein incorporated by reference in their entireties.

BACKGROUND

Demand for access to networks such as the Internet is continuing to increase. Reaching these networks typically requires a data connection to a computing device that is on the network; be it via fiber optic cable, coaxial cable, wireless, satellite, cellular, or other communication connection means. In some premises, such as homes, local wireless access nodes (e.g., wireless "hotspots") can be installed to help extend the reach of networks to spaces such as bedrooms, basements, etc. that are not within easy reach of the wired network connections. Thus, users can move freely through premises without losing connection to the network. However, local wireless access nodes have shortcomings such as limited range causing users to lose connections.

There is a need for an improvement in expanding network access to more and more locations. Also, as the number of users of a network grows, the ability to efficiently manage their connections becomes increasingly desirable.

SUMMARY

It is to be understood that both the following general description and the following detailed description are exemplary and explanatory only and are not restrictive. Provided are methods and systems for deploying and managing a network. In an aspect, systems and methods of the present disclosure can provision wireless access points outside of a premises of a user. In another aspect, network services can be transmitted from a first network device located at a premises to a second network device outside the premises. In a further aspect, the second network device can wirelessly provide the network services.

In an aspect, provided are methods comprising receiving a service signal via a premises drop line and providing a wireless signal based on the service signal. For example, a network device may be disposed externally to a premises associated with the premises drop line.

In another aspect, a service signal can be received or accessed at a premises. A first wireless network can be generated (e.g., provided, broadcast, etc.) in the premises based on at least a portion of the service signal. At least another portion of the service signal can be transmitted upstream to a computing device disposed external to the premises. As an example, the computing device can facilitate generation of a second wireless network at the computing device based on the at least another portion of the service signal.

In another aspect, provided are methods comprising receiving a service signal via one or more ports of a plurality of ports and providing a wireless signal via a bridge in communication with the one or more ports, wherein the wireless signal may be based on the service signal.

In a further aspect, provided are methods for receiving a service signal at a premises via a first specification and transmitting the service signal upstream to a computing device disposed outside the premises via a second specification, wherein the computing device facilitates transmission of a wireless signal based on the service signal.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
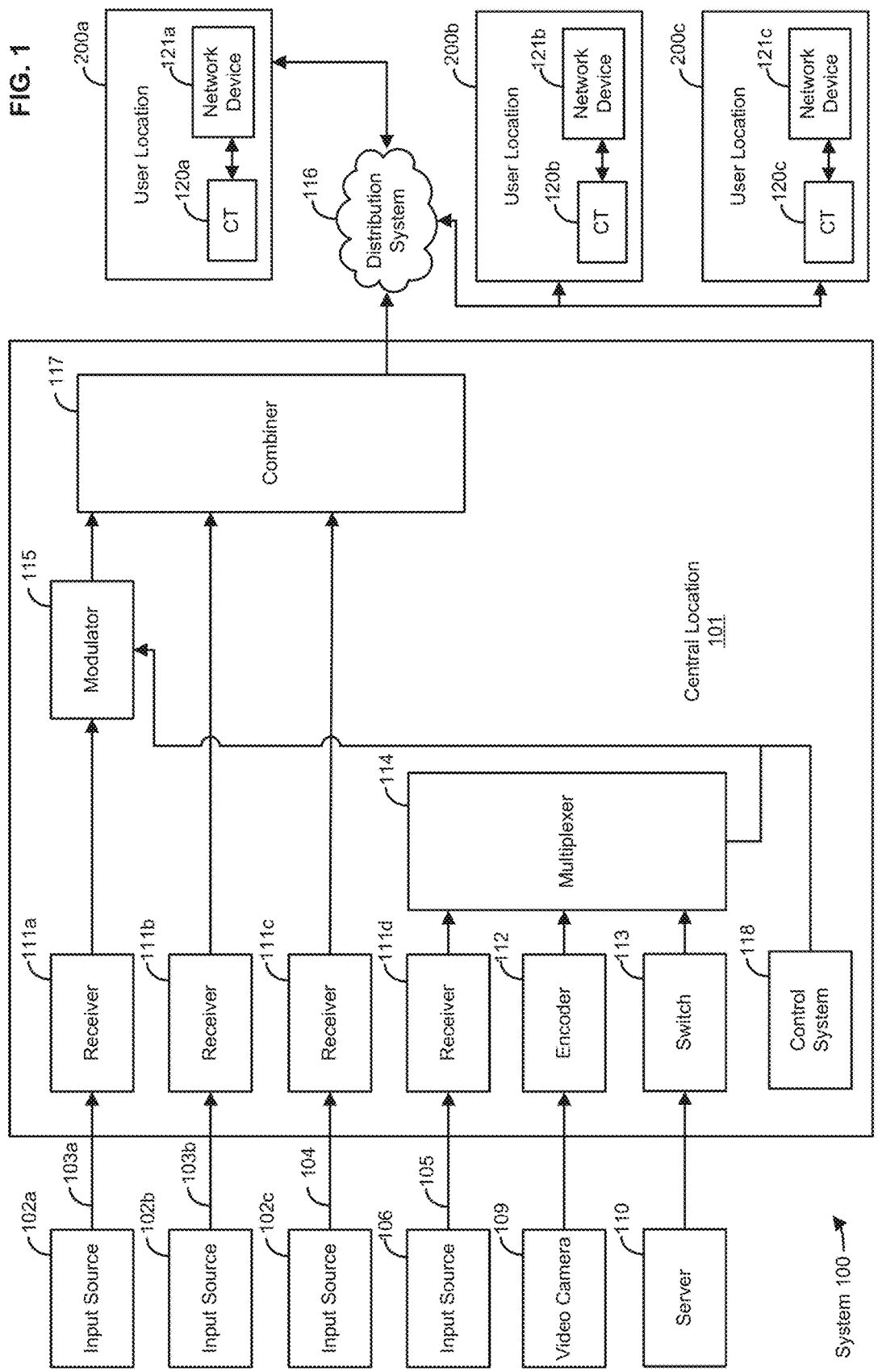
FIG. 1 is a block diagram of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, provided are methods that can comprise transmitting network services to a first network device disposed at a premises of a user. In another aspect, the network services can be transmitted upstream from the first network device to a second network device external to the premises. In a further aspect, the second network device can wirelessly provide the network services, for example, providing a wireless access point (e.g., hot spot) to one or more devices within range of the second network device. As a further example, the second network device can operate as node in a public network. The network services can be routed through a premises network or can be received directly from a service provider.

FIG. 1 illustrates various aspects of an exemplary system in which the present methods and systems can operate. The present disclosure relates to systems and methods for inferring a network topology. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a central office or a headend), which can receive content (e.g., data, programming, and the like) from multiple sources. The central location 101 can combine the content from the various sources and can distribute the content to user (e.g., subscriber) locations (e.g., location 200) via distribution system 116.

In an aspect, the central location 101 can receive content from a variety of sources 102a, 102b, 102c. The content can be transmitted from the source to the central location 101 via a variety of transmission paths, including wireless (e.g., satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders, such as encoder 112, are included for encoding local content or a video camera 109 feed. A switch 113 can provide access to server 110, which can be a Pay-Per-View server, a data server, a network (e.g., internet) router, a network system, a phone system, and the like. Some signals may require additional processing, such as signal multiplexing, prior to being modulated. Such multiplexing can be performed by multiplexer (mux) 114.

The central location 101, in one embodiment, can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user locations 200a, 200b, 200c. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At one or more user locations 200a, 200b, 200c a communication terminal (CT) 120a, 120b, 120c, such as a network device, decoder, or user device can decode, if needed, the signals for display on a display device, such as on a handheld screen or television set (TV) or a computer monitor. Those skilled in the art will appreciate that the signal can be decoded in or for a variety of equipment, including a CT, a computer, a TV, a monitor, or satellite dish. In an exemplary aspect, the methods and systems disclosed can be located within, or performed on, one or more CT's 120a, 120b, 120c, TV's, central locations 101, DVR's, home theater PC's, and the like.

In an aspect, one or more network devices 121a, 121b, 121c (e.g., gateway, router, access point) can be disposed at one or more user locations 200a, 200b, 200c. As an example, one or more of the network devices 121a, 121b, 121c can facilitate the connection of a device, such as user device, to a network such as a local area network (LAN), wide area network (WAN), the Internet, and the like. As a further example, one or more of the network devices 121a, 121b, 121c can be configured as a wireless access point (WAP). In an aspect, one or more network devices 121a, 121b, 121c can be configured to allow one or more wireless devices to connect to a wired and/or wireless network using Wi-Fi, Bluetooth or any desired method or standard.

In an aspect, the network devices 121a, 121b, 121c can be configured as a local area network (LAN). As an example, one or more network devices 121a, 121b, 121c can comprise a dual band wireless access point. As an example, the network devices 121a, 121b, 121c can be configured with a first service set identifier (SSID) (e.g., associated with a user network or private network) to function as a local network for a particular user or users. As a further example, the network devices 121a, 121b, 121c can be configured with a second service set identifier (SSID) (e.g., associated with a public/community network or a hidden network) to function as a secondary network or redundant network for connected communication devices.

In an aspect, one or more network devices 121a, 121b, 121c can comprise an identifier. As an example, one or more identifiers can be or relate to an Internet Protocol (IP) Address IPV4/IPV6 or a media access control address (MAC address) or the like. As a further example, one or more identifiers can be a unique identifier for facilitating communications on the physical network segment. In an aspect, each of the network devices 121a, 121b, 121c can comprise a distinct identifier. As an example, the identifiers can be associated with a physical location of the network devices 121a, 121b, 121c.

In an aspect, one or more network devices 121a, 121b, 121c can be configured to communicate via a protocol, specification (e.g., standard), format, and the like. As an example, one or more network devices 121a, 121b, 121c can be configured to communicate via Multimedia over Coax Alliance (MoCA).

In an aspect, one or more user locations 200a, 200b, 200c is not fixed. By way of example, a user can receive content from the distribution system 116 on a mobile device such as a laptop computer, PDA, smartphone, GPS, vehicle entertainment system, portable media player, and the like. There can be a multitude of user locations connected to distribution system 116.

In an aspect, a first network device (e.g., gateway) located at a premises can receive a network service, for example, via a service signal transmitted to the premises. As an example, the service signal can be received by the first network device via a drop line. As a further example, the drop line can be configured to pass various signals such as analog television, quadrature amplitude modulation (QAM) signals, data over cable service interface specification (DOCSIS) signals, telephony, Internet, AC/DC electricity, and/or telemetry. In another aspect, the first network device can transmit the network service to a second network device (e.g., WeCB wireless MoCA bridge) disposed externally to the premises. As an example, the first network device can transmit an upstream service signal via a drop line. The upstream service signal can comprise one or more of a 2.4 GHz signal and a 5 GHz signal transmitted through a coax drop line (e.g., via Radio Frequency). The drop line can be a leaky coax and can operate as an antenna for broadcasting the upstream signal. The drop line can transmit the upstream service signal into the plant infrastructure, whereby an antenna can be disposed to receive the service signal and broadcast the signal wirelessly. As a further example, the first network device can transmit a service signal via a specification such as MoCA. The upstream service signal can be received (e.g., terminate) at a drop port. As an example, a MoCA point of entry (POE) filter can be associated with the drop port to limit the upstream service signal from traversing back to the service provider. As another example, the second network device (e.g., bridge) can be connected in series with the filter to receive the upstream service signal prior to the filter. The second network device can be configured to provide a wireless signal such as Wi-Fi. As an example, the second network device can be configured to receive a signal via a first specification (e.g., MoCA) and transmit a signal via a second specification (Wi-Fi). The second network device can receive electric power via the premises and/or via an infrastructure associated with a service provider.

In an aspect, a tap (e.g., tap plate) can be associated with one or more premises. As an example, the tap can comprise one or more drop ports. Each of the drop ports can be associated with one or more drop lines to provide services to one or more premises. In another aspect, the tap can receive upstream signals such as service signals from one or more devices located at the downstream premises. In a further aspect, the upstream service signal can be received (e.g., terminate) at one of the drop ports. The tap can be configured to receive a service signal via one or more of the drop ports and transmit a wireless signal based on the received service signal. The tap can be configured to monitor the one or more drop ports and to select the drop port supporting an active upstream signal for processing. As an example, a MoCA POE filter can be associated with the drop port to limit the upstream service signal from traversing back to the service provider. As another example, a network device (e.g., bridge) can be connected in series with the filter to receive the upstream service signal prior to the filter. The network device can be configured to provide a wireless signal such as Wi-Fi. As an example, the network device can be configured to receive a signal via a first specification (e.g., MoCA) and transmit a signal via a second specification (e.g., Wi-Fi). The network device can receive electric power via the premises and/or via an infrastructure associated with a service provider.

In an aspect, a network device (e.g., gateway) located at a premises can receive a network service, for example, via a service signal transmitted to the premises. As an example, the service signal can be received by the network device via a drop line. As a further example, the drop line can be configured to pass various signals such as analog television, QAM signals, DOCSIS signals, telephony, Internet, and/or telemetry. The network device at the premises can be configured to transmit one or more of a 2.4 GHz signal and a 5 GHz signal through a coax drop line. The drop line can be a leaky coax and can operate as an antenna for broadcasting the upstream signal. As a further example, the first network device can transmit a service signal via a specification such as MoCA.

In another aspect, the network device can comprise a splitter to divide the incoming service in two or more service signals, such as a 2.4 GHz signal and a 5 GHz signal, for example. As an example, a first split signal can be transmitted to internal devices at the premises, for example, to provide service to a LAN at the premises. As another example, a second split signal can be transmitted upstream of the network device. The second split signal can be transmitted to an amplifier. As an example, the amplifier can have enough gain to overcome the loss of the drop cable (e.g., approximately 10 db at 2.4 GHz for 100' or up to 15 db at 5 GHz for 100'). The amplified second split signal can be transmitted to an upstream antenna for wireless transmission. In a further aspect, the second split signal can be separated from other signals and transmitted upstream via leaky coax. The leaky coax can form a long antenna for distribution of a wireless signal. A radiating or leaky cable, such as leaky coax, can be constructed with tuned slots cut into the shield. These slots are tuned to a specific RF wavelength of operation or tuned to a specific radio frequency band. Such leaky coax can provide a tuned bi-directional leakage effect between transmitter and receiver.

In an aspect, a signal can be received or accessed by a device such as a user device. In an aspect, the signal can be a trigger signal such as an "I'm Lost" signal. As an example, a device that does not have connectivity with a network can select a communication channel (e.g., wireless channel) and can transmit a signal (e.g., trigger signal). Such a signal can represent identification information (e.g., serial number, MAC address, etc.) and location information associated with the source of the signal. The information represented by the signal can aid in recovering and/or reconfiguring the device that does not have connectivity with a network.

In an aspect, the trigger signal can indicate that the source of the trigger signal is not activated on one or more networks. In another aspect, a device receiving the trigger signal can determine a geolocation of itself or a local device at or near the time the trigger signal is received. In a further aspect, a device receiving the trigger signal can be configured to determine location using one or more location services such as GPS, Wi-Fi, cellular, near field, Zigbee or the like. In a further aspect, information relating to the determined location can be transmitted. In an aspect, the device receiving the trigger signal can transmit location information to a network service provider to facilitate activation of the device on a network. As an example, the location information can be transmitted over a first network such as a cellular network to facilitate connection to a second network such as an IP network.

Figure 2:
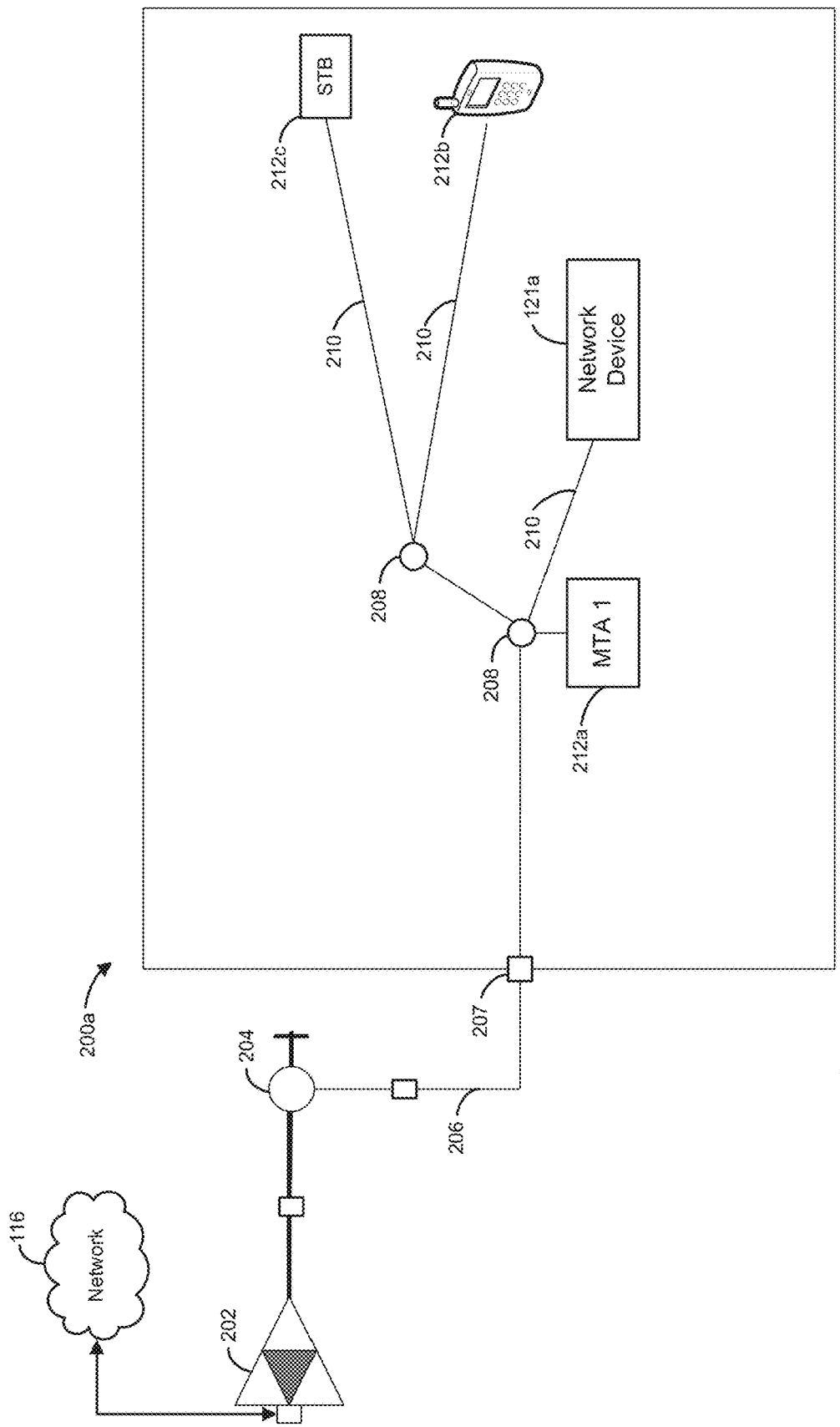
FIG. 2 is a schematic representation of an exemplary network.

FIG. 2 illustrates an exemplary user location 200a. As shown, in one embodiment, an amplifier 202 can be disposed in signal communication with a network, such as the distribution system 116 to receive signals therefrom. In an aspect, the amplifier 202 can be a part of the distribution system 116. Any number of the amplifiers 202 and other signal processing devices can be interposed between the distribution system 116 and the user location 200a. As an example, the amplifier 202 provides a pre-determined amplified input to a downstream component (e.g., output from the amplifier 202). As a further example, a value of the amplified input can be about 17 dBmV. In an aspect, a value of the amplified input can be between 16-18 dBmV. However, other values having other variances can be used.

A tap 204 can be in signal communication with the amplifier 202 to receive amplified signals, such as the amplified input, therefrom. As an example, the tap 204 can receive a signal directly from the distribution system 116. In an aspect, the tap 204 can provide an access point for "tapping" (e.g., accessing, capturing, analyzing, etc.) the signals transmitted by the distribution system 116 for the particular user location 200a. It is further understood that any number of taps 204 can be used for particular applications, such as a multiple unit dwellings, business applications, office buildings, warehouses, etc.

In an aspect, an amount of signal energy presented at the tap(s) 204 to a user can depend upon at least two factors, namely, the available signal energy at the tap 204 and a padding level (e.g., attenuation value of any pad, attenuator, coupler, or the like) of the tap 204. As an example, the padding level of the tap 204 can be adjusted by adding or removing attenuation devices such as pads, attenuators, and the like. However, other factors can be considered such as loss of signal power (e.g., insertion loss or through-put loss) resulting from the insertion of a device (e.g., the tap 204) in a transmission line or network. By way of example, the tap(s) 204 can be padded at 14, 20, 23, 26 or 29 dB below the signal level input in order to provide the proper signal attenuation to users who may be close or distant from a tap off unit and/or the central location 101. As a further example, the signal level input at the tap 204 can be reduced for devices closer to the tap off unit. Devices positioned further from the tap off unit and/or the central location 101 may require less padding at the tap 204 to receive a desired signal level at the device. However, other padding levels and configurations can be used.

In an aspect, a drop line 206 (e.g., cable or wireless link) can be coupled to the tap 204 and routed into a physical structure or premises such as the user's home or business to provide a flow path for the signals received from and sent to the distribution system 116. As an example, the drop line 206 can have a length of 400 feet with an attenuation of −1.0 dBmV per 100 feet of length. Accordingly, the drop line 206 can have a drop loss of −4.0 dBmV.

In an aspect, a ground block 207 can be coupled to the drop line 206 downstream from the tap 204. Typically, the ground block 207 has a low through-put loss of signal (e.g., insertion loss) or signal attenuation and is not usually figured into an attenuation calculation. However, any insertion loss due to the ground block 207 can be included in the appropriate calculations described in further detail herein.

A splitter or plurality of splitters 208 can be disposed at or near a physical structure at the user location 200a to create a premises distribution topology to send/receive signals throughout various locations in the home or business. As an example, a first one of the splitters 208 can be coupled to the tap 204 by the drop line 206. As a further example, a first one of the splitters 208 can be coupled directly to the ground block 207. In an aspect, each of the splitters 208 can have an attenuation factor inherently associated therewith. For example, the following table provides exemplary attenuation values for particular types of the splitters 208:

| Splitter Type | Typical Attenuation |
| --- | --- |
| 2 way splitter | −4 dBmV |
| 3 way unbalanced splitter | −4, −4, −7 dBmV |
| 3 way balanced splitter | −5.5, −5.5, −5.5 dBmV |
| 4 way splitter | −7 dBmV |
| 8 way splitter | −11 dBmV |

It is understood that any splitter or similar device having any attenuation can be used without departing from the spirit of the present disclosure. One skilled in the art would understand that various configurations of the splitters 208 can be used to support the distribution requirements of any particular location or premises.

A plurality of premises lines 210, such as wireless links or cables, can be coupled to the first one of the splitters 208 or directly to the network 116 to distribute the signals (e.g., coaxial fiber, Ethernet, electrical, etc.) through the user location 200a. In an aspect, each of the premises lines 210 can have an attenuation factor inherently associated therewith. For example, the following table provides exemplary attenuation values for particular lengths of the premises lines 210 as well as other devices that may be coupled to the premises lines 210:

| Component | Typical Attenuation |
| --- | --- |
| 100' RG6 coaxial | −1.25 dBmV |
| DOCSIS Equalizer (NMTER = 1): | −1 dBmV |
| In-Home Amplifier | −1 dBmV |

It is understood that any premises lines or cables having any attenuation can be used without departing from the spirit of the present disclosure. One skilled in the art would understand that various configurations of the premises lines 210 can be used to support the distribution requirements of any particular location or premises.

In an aspect, other splitters 208 or devices 212 can be coupled to the premises lines 210 to receive the signals therefrom. Accordingly, the devices 212 in the user location 200 can be connected to the distribution system 116 through the tap 204. As an example, the connected devices 212 can include a multimedia terminal adapter (MTA) 212a, a network device 121a (e.g., router, server, etc.), a terminal such as a set-top box (STB) 212c, a mobile device such as a smart phone 212b, or other devices in communication with the tap 204. As a further example, the devices 212 can include in-home devices such as appliances, user devices, and systems configured to receive signals from at least one of the distribution system 116 and the central location 101.

Figure 3:
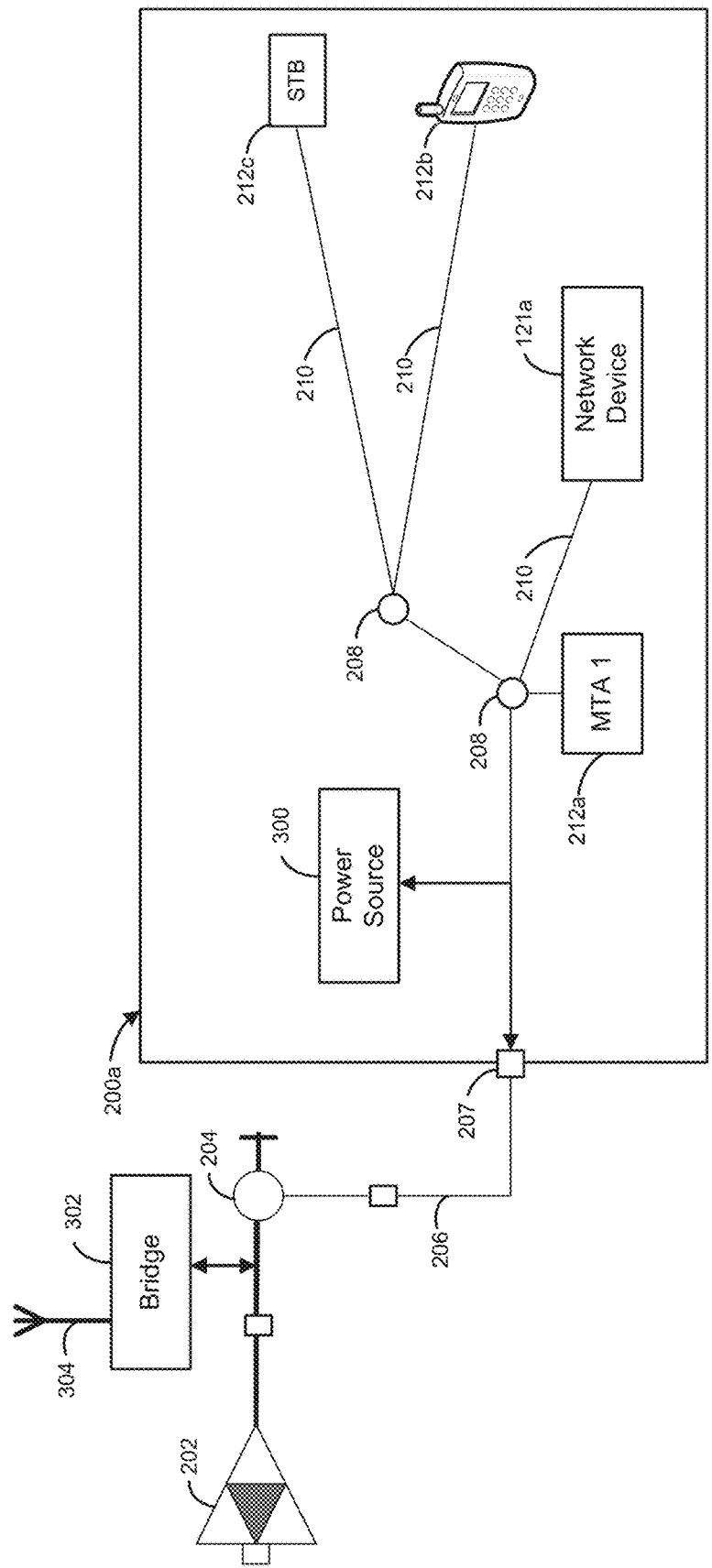
FIG. 3 is a schematic representation of an exemplary network.

As shown in FIG. 3, a first network device (e.g., gateway, network device 121a) located at the premises 200a can receive a network service, for example, via a service signal transmitted to the premises. As an example, the service signal can be received by the first network device via drop line 206. As a further example, the drop line 206 can be configured to pass various signals such as network connectivity, analog or digital television, QAM signals, DOCSIS signals, telephony, telemetry, etc. In another aspect, the first network device can transmit the network service to a second network device (e.g., bridge 302) disposed externally to the premises. As an example, the first network device can transmit an upstream service signal via drop line 206. As a further example, the first network device can transmit a service signal via a specification such as MoCA. In a further aspect, the upstream service signal can be received (e.g., terminated) at a drop port. As an example, a MoCA POE filter can be associated with the drop port to limit the upstream service signal from traversing back to the service provider. As another example, the second network device (e.g., bridge 302) can be connected in series with the filter to receive the upstream service signal prior to the filter. The second network device can be configured to provide a wireless signal such as Wi-Fi via an antenna 304. As an example, the second network device can be configured to receive a signal via a first specification (e.g., MoCA) and transmit a signal via a second specification (Wi-Fi). The second network device can receive electric power via the premises (e.g., via power source 300) and/or via an infrastructure associated with a service provider.

Figure 4:
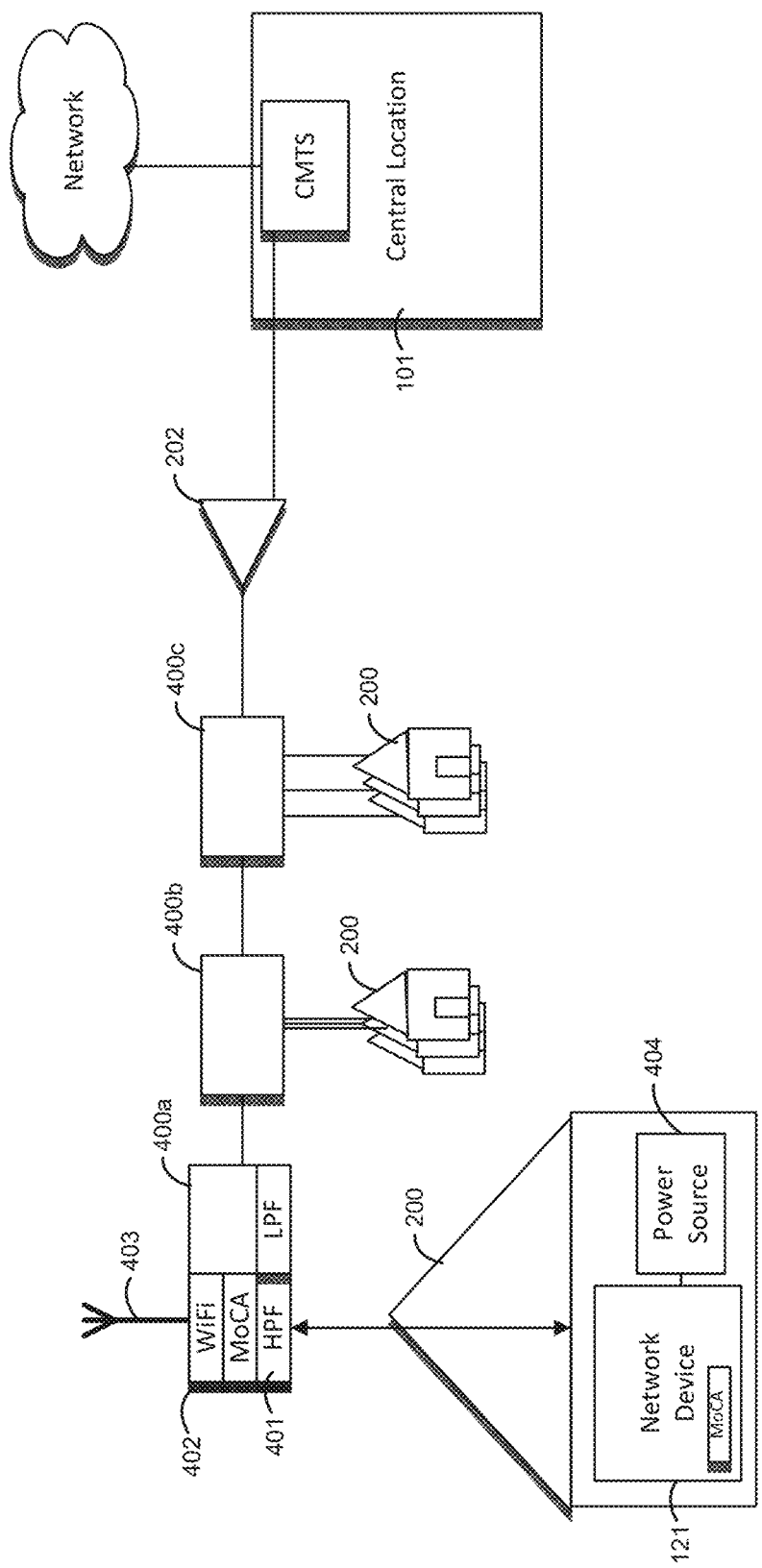
FIG. 4 is a schematic representation of an exemplary network.
Figure 5:
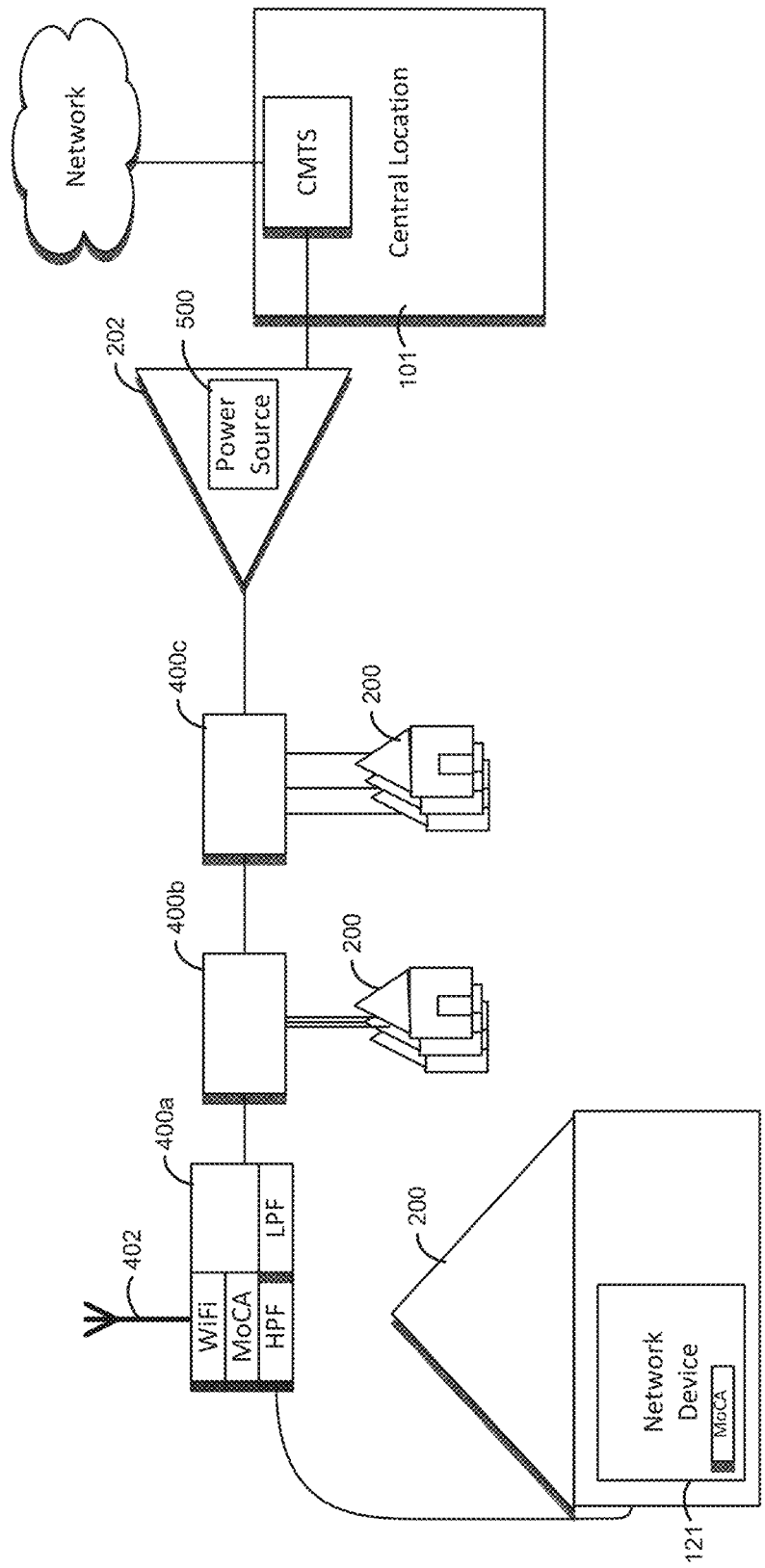
FIG. 5 is a schematic representation of an exemplary network.

As shown in FIG. 4, a tap (e.g., tap plate 400a, 400b, 400c) can be associated with one or more premises 200. As an example, the tap can comprise one or more drop ports. Each of the drop ports can be associated with one or more drop lines to provide services to one or more premises. In another aspect, the tap can receive upstream service signals such as service signals form one or more devices located at the downstream premises. In a further aspect, the upstream service signal can be received (e.g., terminate) at one of the drop ports. The tap can be configured to receive a service signal via one or more of the drop ports and transmit a wireless signal based on the received service signal. The tap can be configured to monitor the one or more drop ports and to select the drop port supporting an active upstream signal for processing. As an example, a filter 401, such as a MoCA POE filter (e.g., high pass filter (HPF), low pass filter (LPF)) can be associated with the drop port to limit the upstream service signal from traversing upstream further than desired, such as to the service provider. As another example, a network device 402 (e.g., bridge) can be connected in series with the filter 401 to receive the upstream service signal prior to the filter 401. The network device 402 can be configured to provide a wireless signal such as Wi-Fi. As an example, the network device 402 can be configured to receive a signal via a first specification (e.g., MoCA) and transmit a signal via a second protocol or specification (e.g., Wi-Fi) using an antenna 403. As a further example, the network device 121 can receive a signal and can transmit the signal to the network device 402 via a first specification (e.g., MoCA), wherein the network device 402 can convert the signal and can transmit a converted signal via a second protocol or specification (e.g., Wi-Fi). The network device 402 can receive electric power via the premises (e.g., power source 404) and/or via an infrastructure associated with a service provider, such as power source 500 (e.g., power injector in the network infrastructure), as show in FIG. 5. As an example, in FIG. 5 one or more devices (e.g., devices disposed at one or more taps) can receive electrical power from the power source 500. As a further example, electrical power can be received from a network plant utilizing existing plant power supplies. Electrical power can cascade through multiple taps to provide power to the one or more devices network devices. Such electrical power can be restricted from flowing to the one or more premises 200.

Figure 6:
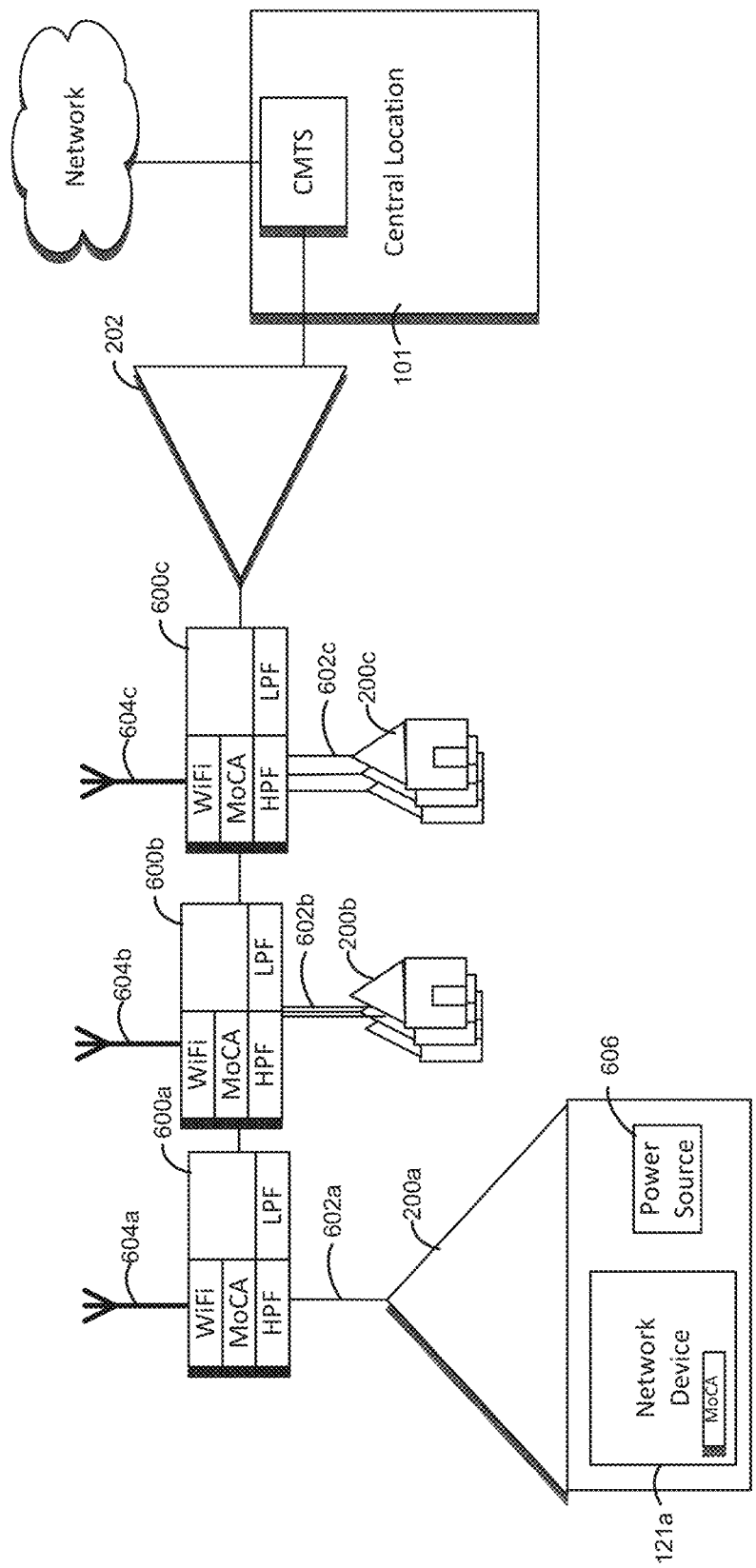
FIG. 6 is a schematic representation of an exemplary network.

As shown in FIG. 6, a tap (e.g., tap plate 600a, 600b, 600c) can be associated with one or more premises 200a, 200b, 200c. As an example, the tap can comprise one or more drop ports. Each of the drop ports can be associated with one or more drop lines 602a, 602b, 602c to provide services to one or more premises 200a, 200b, 200c. In another aspect, the tap can receive upstream signals such as service signals from one or more downstream devices located at the premises 200a, 200b, 200c. In a further aspect, the upstream service signal can be received (e.g., terminate) at one of the drop ports. The tap can be configured to receive a service signal via one or more of the drop ports (e.g., from a network devices such as network device 121) and transmit a wireless signal based on the received service signal. The tap can be configured to monitor the one or more drop ports and to select the drop port supporting an active upstream signal for processing. As an example, a MoCA POE filter (e.g., high pass filter (HPF), low pass filter (LPF)) can be associated with the drop port to limit the upstream service signal from traversing upstream further than desired, such as to the service provider. As another example, a network device (e.g., bridge) can be connected in series with the filter to receive the upstream service signal prior to the filter. The network device can be configured to provide a wireless signal or network service such as Wi-Fi. As an example, the network device can be configured to receive a signal via a first specification (e.g., MoCA) and transmit a signal via a second specification (e.g., Wi-Fi) using one or more antennas 604a, 604b, 604c. The network device can receive electric power via the premises (e.g., power source 606) and/or via an infrastructure associated with a service provider (e.g., central location 101) such as power injector in the cable infrastructure, as show in FIG. 5. As an example, when power is received from the premises, the power can be filtered from certain upstream components such as the central location.

Figure 7:
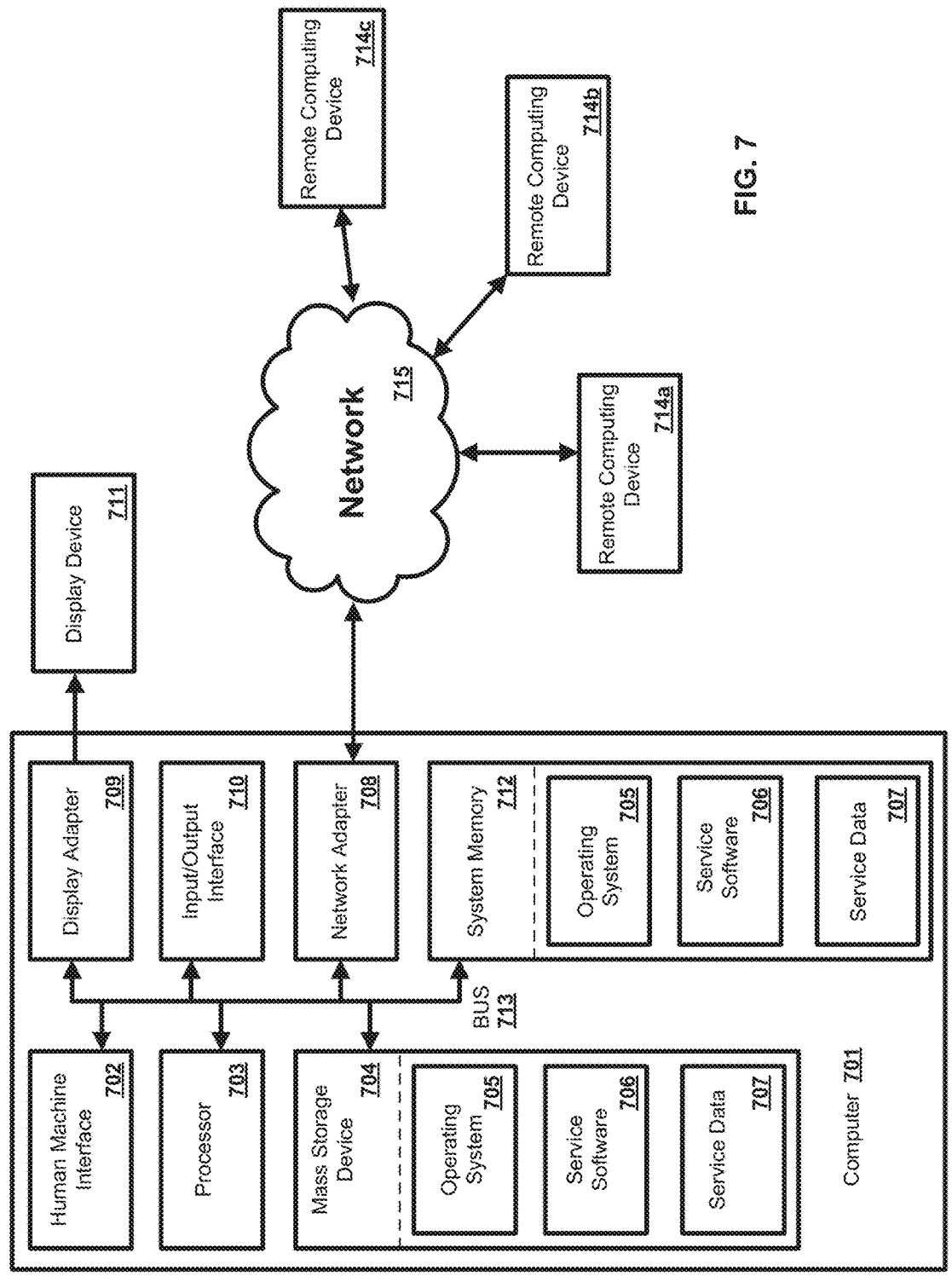
FIG. 7 is a block diagram of an exemplary computing device.

In an exemplary aspect, the methods and systems can be implemented on a computing device such as a computing device 701 (e.g., computer) as illustrated in FIG. 7 and described below. By way of example, CT 120a, 120b, 120c, and/or network devices 121a, 121b, 121c of FIG. 1 can be a computing device as illustrated in FIG. 7. Similarly, the methods and systems disclosed can utilize one or more computing device to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 701. The components of the computing device 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB), inter-integrated circuit (i2C), serial peripheral interface (SPI), universal asynchronous receiver/transmitter (UART), and the like. The bus 713, and all buses specified in this description, can also be implemented over a wired or wireless network connection and each of the subsystems, including the processor 703, a mass storage device 704, an operating system 705, a service software 706, a service data 707, a network adapter 708, system memory 712, an Input/Output Interface 710, a display adapter 709, a display device 711, and a human machine interface 702, can be contained within one or more remote computing devices 714a, 714b, 714c at physically separate locations, connected through buses of this form, in effect implementing a fully distributed system.

The computing device 701 typically comprises a variety of computer readable media. Exemplary readable media can be any available media that is accessible by the computing device 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as service data 707 and/or program modules such as operating system 705 and service software 706 that are immediately accessible to and/or are presently operated on by the processing unit 703.

In another aspect, the computing device 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computing device 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and service software 706. Each of the operating system 705 and service software 706 (or some combination thereof) can comprise elements of the programming and the service software 706. Service data 707 can also be stored on the mass storage device 704. Service data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computing device 701 can have more than one display adapter 709 and the computing device 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computing device 701 via Input/Output Interface 710. Any step and/or result of the methods can be output in any form to an output device. Such output can be any form of visual representation, including, but not limited to, textual, graphical, animation, audio, tactile, and the like. The display 711 and computing device 701 can be part of one device, or separate devices.

The computing device 701 can operate in a networked environment using logical connections to one or more remote computing devices 714a, 714b, 714c. By way of example, a remote computing device can be a personal computer, portable computer, smartphone, a server, a router, a network computer, a peer device or other common network node, and so on. Logical connections between the computing device 701 and a remote computing device 714a, 714b, 714c can be made via a network 715, such as a local area network (LAN) and a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of service software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

Figure 8:
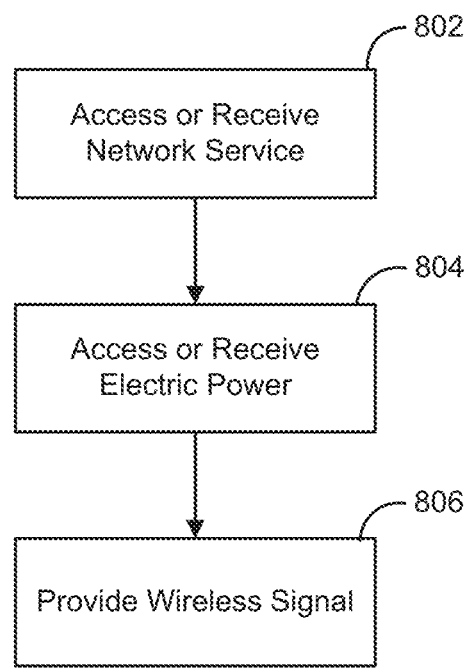
FIG. 8 is a flow chart of an exemplary method.

FIG. 8 illustrates an exemplary method. In step 802, a network service signal can be received, for example, via a premises drop line. As an example, the service signal can relate to network services, such as a network (e.g., Internet) connection. As another example, the service signal can be MoCA compatible. In an aspect, the service signal can be received by a computing device (e.g., bridge) upstream of the premises. As an example, the service signal can be transmitted upstream of the premises via the premises drop line, or another communication link, to a receiving computing device disposed external to the premises. As a further example, the service signal can be received via other signal paths.

In step 804, electric power can be received. In an aspect, the computing device (e.g., bridge) receiving the service signal can receive the electric power. As an example, the electric power can be received from the premises at a device located outside the premises. As a further example, the electric power can be received from a service provider disposed remotely from the premises.

In step 806, a wireless signal can be provided based on the service signal. In an aspect, the computing device (e.g., bridge) can be configured to receive the service signal external the premises and provide the wireless signal based on the service signal. The computing device can be disposed external a premises associated with the premises drop line. In another aspect, providing the wireless signal can comprise converting the service signal to a wireless signal. In a further aspect, the wireless signal facilitates connection between a network service and a device receiving the wireless signal.

Figure 9:
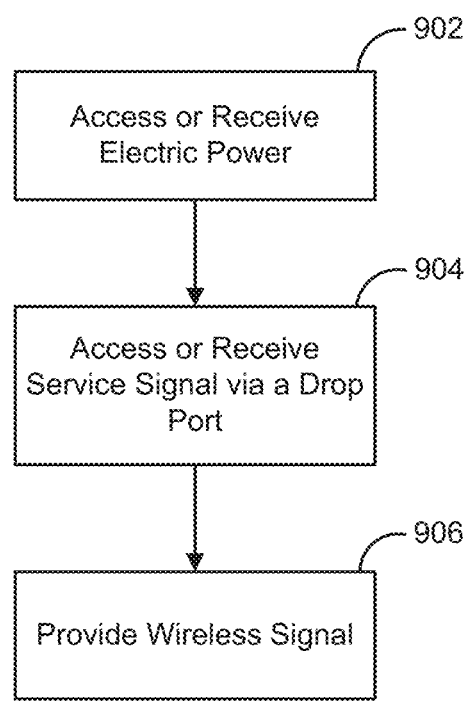
FIG. 9 is a flow chart of an exemplary method.

FIG. 9 illustrates an exemplary method. In step 902, electric power can be received. As an example, the electric power can be received from the premises. As a further example, the electric power can be received from a service provider disposed remotely from the premises. In an aspect, the electric power can be received at a tap. As an example, the tap can comprise a plurality of drop ports.

In step 904, a service signal can be received, for example, via a drop port of a service tap. As an example, the service signal can relate to network services. As another example, the service signal can be MoCA compatible. In an aspect, the service signal can be received via a premises drop line associated with a premises. In a further aspect, the service signal can be received via one or more of the plurality of drop ports of the tap. As an example, the service signal can be transmitted upstream the premises via the premises drop line to a receiving tap disposed external to the premises.

In step 904, a wireless signal can be provided based on the service signal. In an aspect, the tap can be configured to receive the service signal and provide the wireless signal based on the service signal. The tap can be disposed external to a premises associated with the premises drop line. In another aspect, providing the wireless signal can comprise converting the service signal to a wireless signal. In a further aspect, the wireless signal facilitates connection between a network service and a device receiving the wireless signal.

Figure 10:
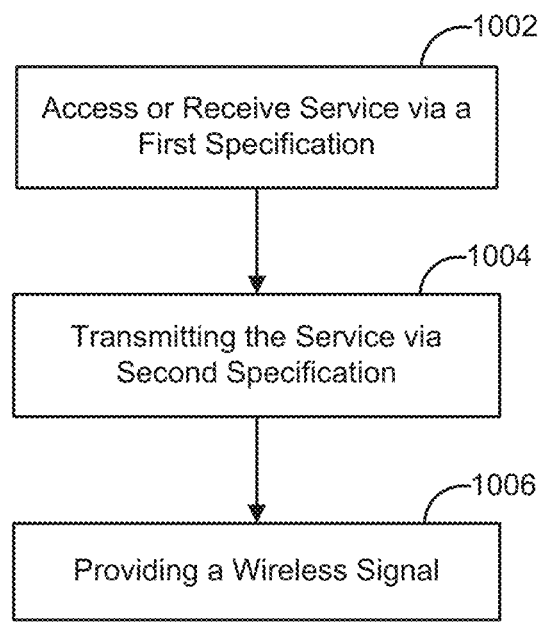
FIG. 10 is a flow chart of an exemplary method.

FIG. 10 illustrates an exemplary method. In step 1002, a service signal can be received or accessed according to a first specification or protocol such as radio frequency (RF), Internet protocol (IP), and the like. As an example, the service signal can relate to network services. In an aspect, the service signal can be received via a premises drop line associated with a premises. In a further aspect, the service signal can be received via one or more of the plurality of drop ports of the tap. As an example, the service signal can be transmitted downstream to the premises via the premises drop line to a receiving device disposed at the premises.

In step 1004, the service signal can be transmitted according to a second specification or protocol such as MoCA. In an aspect, the service signal can be transmitted upstream to a computing device disposed outside the premises. In an aspect, the service signal can be received via a premises drop line associated with a premises. In a further aspect, the service signal can be received via one or more of the plurality of drop ports of the tap. As an example, the service signal can be transmitted upstream of the premises via the premises drop line to a receiving device such as a tap or computing device disposed external to the premises.

In step 1006, a wireless signal can be provided based on the service signal transmitted. In an aspect, the tap can be configured to receive the service signal and provide the wireless signal based on the service signal. The tap can be disposed external a premises associated with the premises drop line. In another aspect, providing the wireless signal can comprise converting the service signal (e.g., in the second specification) to a wireless signal. In a further aspect, the wireless signal facilitates connection between a network service and a device receiving the wireless signal.

Figure 11:
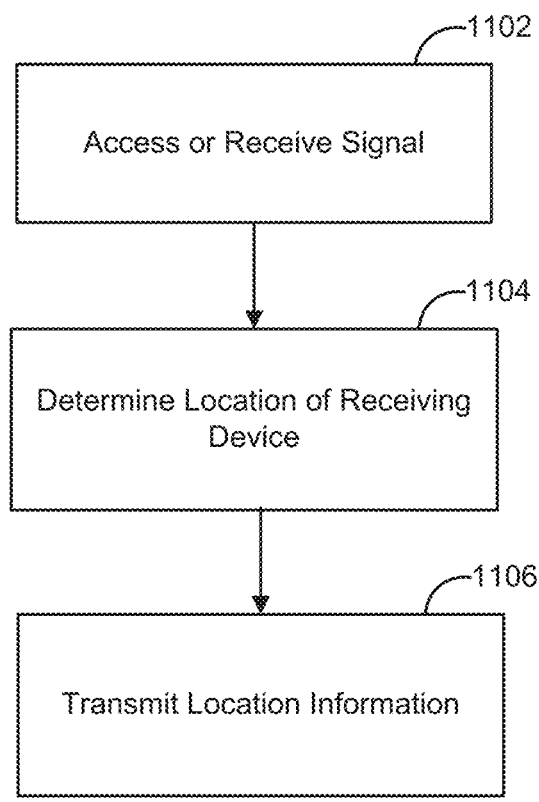
FIG. 11 is a flow chart of an exemplary method.

FIG. 11 illustrates an exemplary method. In step 1102, a signal can be received or accessed by a device such as a user device. In an aspect, the signal can be a trigger signal such as an "I'm Lost" signal. As an example, a device that does not have connectivity with a network can select a communication channel (e.g., wireless channel) and can transmit a signal (e.g., trigger signal). Such a signal can represent identification information (e.g., serial number, MAC address, etc.) and location information associated with the source of the signal. The information represented by the signal can aid in recovering and/or reconfiguring the device that does not have connectivity with a network.

In an aspect, the trigger signal can indicate that the source of the trigger signal is not activated on one or more networks. In another aspect, a device receiving the trigger signal can determine a geolocation of itself or a local device at or near the time the trigger signal is received. In a further aspect, a device receiving the trigger signal can be configured to determine location using one or more location services such as GPS, Wi-Fi, cellular, near field, Zigbee or the like. In a further aspect, information relating to the determined location can be transmitted. In an aspect, the device receiving the trigger signal can transmit location information to a network service provider to facilitate activation of the device on a network. As an example, the location information can be transmitted over a first network such as a cellular network to facilitate connection to a second network such as an IP network.

In step 1104, a location can be determined. In an aspect, a device receiving the trigger signal can determine a geolocation of itself or a local device at or near the time the trigger signal is received. In a further aspect, a device receiving the trigger signal can be configured to determine location using one or more location services such as GPS, Wi-Fi, cellular, near field, Zigbee or the like.

In step 1106, information relating to the determined location can be transmitted. In an aspect, the device receiving the trigger signal can transmit location information to a network service provider to facilitate activation of the device on a network. As an example, the location information can be transmitted over a first network such as a cellular network to facilitate connection to a second network such as an IP network.

Figure 12:
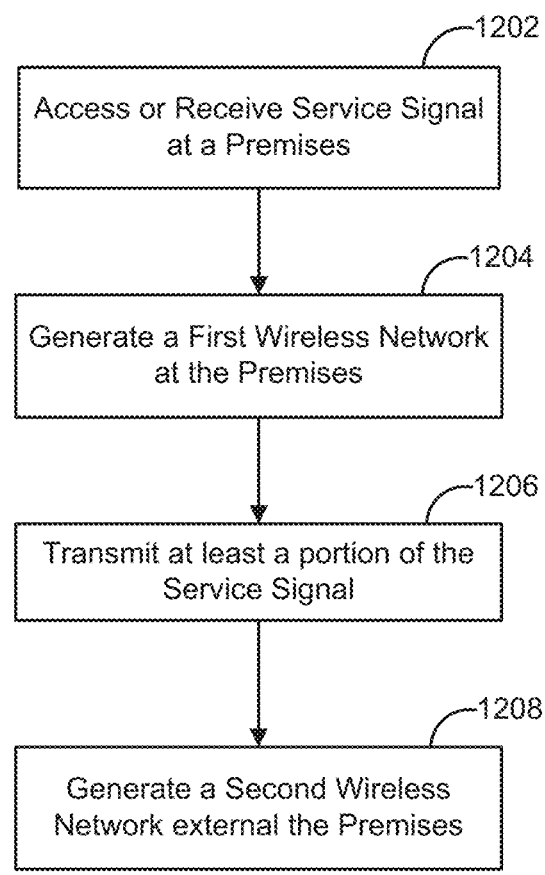
FIG. 12 is a flow chart of an exemplary method.

FIG. 12 illustrates an exemplary method. In step 1202, a service signal can be received or accessed at a premises. In an aspect, the service signal can be received or accessed according to a first specification or protocol such as radio frequency (RF), Internet protocol (IP), and the like. As an example, the service signal can relate to network services. In an aspect, the service signal can be received via a premises drop line associated with a premises. In a further aspect, the service signal can be received via one or more of the plurality of drop ports of the tap. As an example, the service signal can be transmitted downstream to the premises via the premises drop line to a receiving device disposed at the premises.

In step 1204, a first wireless network can be generated (e.g., broadcast, provided, etc.). In an aspect, the first wireless network can be generated in the premises such that a wireless signal associated with the first wireless network is transmitted in the premises. The generating the first wireless network can be based on at least a portion of the service signal such as a split portion. The split portion can be configured to feed a particular frequency band (e.g., 2.4 GHz, 5 GHz, etc.) associated with the first wireless network. As an example, a portion of a bandwidth associated with the received service signal can be used to generate the first wireless network. As a further example, the first wireless network can be a private network. However, other networks (e.g., private or public) can be generated.

In step 1206, the received service signal can be transmitted, for example, outside the premises. In an aspect, the received service signal can be transmitted via a specification or protocol such as MoCA. In an aspect, at least a portion of the service signal can be transmitted upstream from the premises to a computing device disposed external to the premises. As an example, a portion of the received service signal can be used to generate the first wireless network, while at least another portion of the received service signal can be transmitted to the computing device. As a further example, a portion of a bandwidth associated with the received service signal can be used to generate the first wireless network, while at least another portion of the bandwidth associated with the received service signal can be transmitted to the computing device. As another example, another portion of the bandwidth can comprise a portion of the received service signal split and configured to feed a particular frequency band (e.g., 2.4 GHz, 5 GHz, etc.). As a further example, the computing device facilitates generation of a second wireless network at the computing device based on the service signal. In another aspect, at step 1208, a second wireless network can be generated (e.g., broadcast, provided, etc.) via the computing device. In an aspect, the second wireless network can be generated external to the premises. The generating the second wireless network can be based on at least a portion of the service signal. As an example, the first wireless network can be a private network and the second wireless network can be a public network. As such, the first wireless network can provide private network service coverage in and/or around the premises, while the second wireless network can provide public network service coverage in, around, and/or external the premises. However, other network configurations can be used.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   determining, by a first computing device, that the first computing device is unable to connect to a first network;
   transmitting, by the first computing device to a user device via a wireless communications network, a trigger signal comprising a device identifier of the first computing device, wherein the trigger signal indicates that the first computing device cannot access the first network;
   receiving, by the user device from the first computing device, the trigger signal;
   determining a location associated with the first computing device;
   transmitting, to a second computing device, the device identifier and the location associated with the first computing device;
   receiving, by the second computing device, the device identifier and the location associated with the first computing device; and
   activating, by the second computing device, a connection to the first computing device to facilitate the first computing device accessing the first network.

2. The method of claim 1, wherein the trigger signal further comprises data that indicates location information of the first computing device, and wherein determining the location associated with the first computing device is based on the data.

3. The method of claim 1, further comprising selecting, by the first computing device, a wireless communications channel.

4. The method of claim 1, wherein determining the location associated with the first computing device further comprises determining the location associated with the first computing device using at least one of a Global Positioning System (GPS), a cellular network, a Wi-Fi network, or a near field communication (NFC) network.

5. The method of claim 1, wherein the second computing device is associated with a network service provider that provides access to the first network, and wherein the user device is configured to access the first network.

6. The method of claim 1, wherein transmitting, to the second computing device, the device identifier and the location associated with the first computing device further comprises transmitting, via a second network, the device identifier and the location associated with the first computing device, wherein the device identifier comprises at least one of a serial number of the first computing device or a Media Access Control (MAC) address of the first computing device.

7. The method of claim 1, further comprising connecting, by the first computing device, to the first network.

8. A method, comprising:
   selecting, by a first computing device, a wireless communications channel;
   transmitting, by the first computing device to a user device via the selected wireless communications channel, a trigger signal comprising a device identifier of the first computing device, wherein the trigger signal indicates that the first computing device cannot access the first network;
   determining a location associated with the first computing device;
   transmitting, to a second computing device, the device identifier and the location associated with the first computing device;

receiving, by the second computing device, the device identifier and the location associated with the first computing device;
activating, by the second computing device, a connection to the first computing device to facilitate the first computing device accessing the first network; and
connecting, by the first computing device, to the first network.

9. The method of claim 8, wherein the trigger signal further comprises data that indicates location information of the first computing device.

10. The method of claim 8, wherein determining the location associated with the first computing device further comprises determining the location associated with the first computing device using at least one of a Global Positioning System (GPS), a cellular network, a Wi-Fi network, or a near field communication (NFC) network.

11. The method of claim 8, further comprising:
determining, by the first computing device, that the first computing device is unable to connect to the first network; and
receiving, by the user device from the first computing device, the trigger signal.

12. The method of claim 8, wherein the device identifier comprises at least one of a serial number of the first computing device or a Media Access Control (MAC) address of the first computing device.

13. The method of claim 8, wherein the first network comprises an Internet Protocol (IP) network.

14. A system, comprising:
a first computing device configured to,
determine that the first computing device is unable to connect to a first network, and
transmit, via a wireless communications network, a trigger signal comprising a device identifier of the first computing device, wherein the trigger signal indicates that the first computing device cannot access the first network;
a user device configured to,
receive, from the first computing device, the trigger signal,
determine a location associated with the first computing device, and
transmit the device identifier and the location associated with the first computing device; and
a second computing device configured to,
receive, from the user device, the device identifier and the location associated with the first computing device, and
activate a connection to the first computing device to facilitate the first computing device accessing the first network.

15. The system of claim 14, wherein the trigger signal further comprises data that indicates location information of the first computing device.

16. The system of claim 14, wherein the first computing device is further configured to:
select a wireless communications channel; and
connect to the first network.

17. The system of claim 14, wherein the user device comprises a wireless transceiver, and wherein the user device is further configured to determine, via the wireless transceiver, the location associated with the first computing device using at least one of a Global Positioning System (GPS), a cellular network, a Wi-Fi network, or a near field communication (NFC) network.

18. The system of claim 14, wherein the second computing device is associated with a network service provider that provides access to the first network, and wherein the user device is configured to access the first network.

19. The system of claim 14, wherein the second computing device is further configured to receive the device identifier and the location associated with the first computing device via a second network, wherein the device identifier comprises at least one of a serial number of the first computing device or a Media Access Control (MAC) address of the first computing device.

20. The system of claim 19, wherein the first network comprises an Internet Protocol (IP) network and the second network comprises a cellular network.

* * * * *